March 29, 1932.    L. M. GOODWIN    1,851,094
TOBACCO TRUCK
Filed July 13, 1928
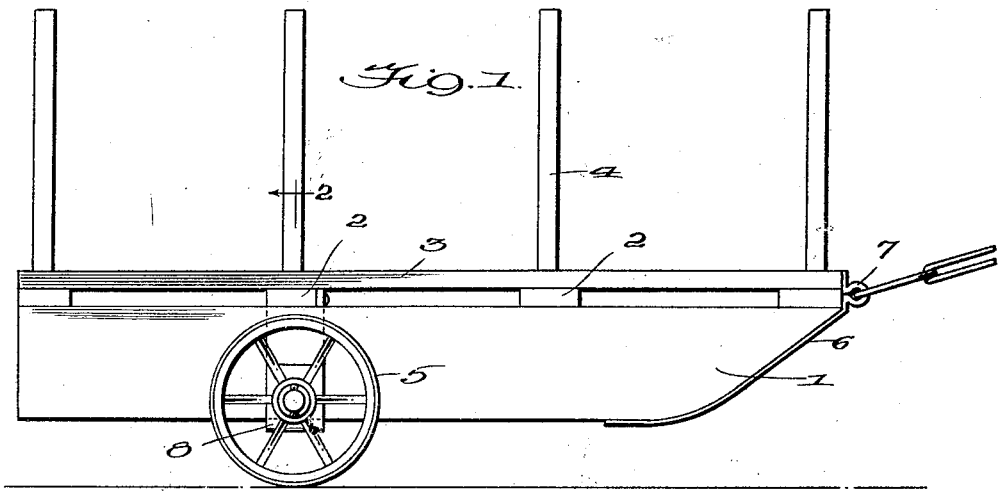
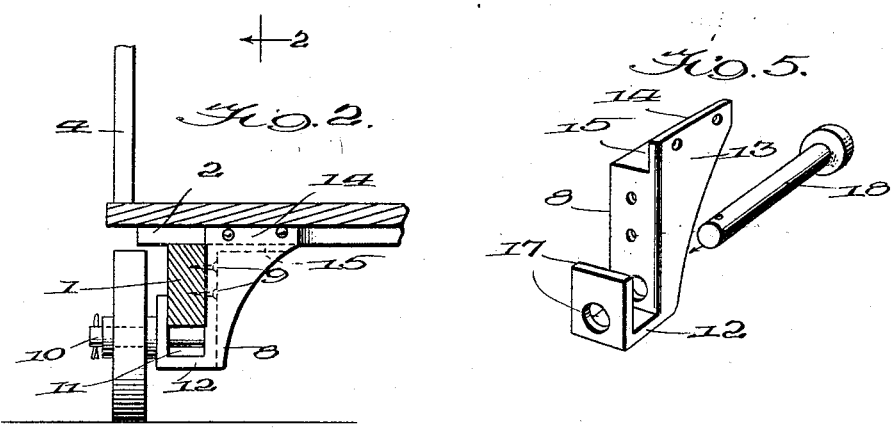
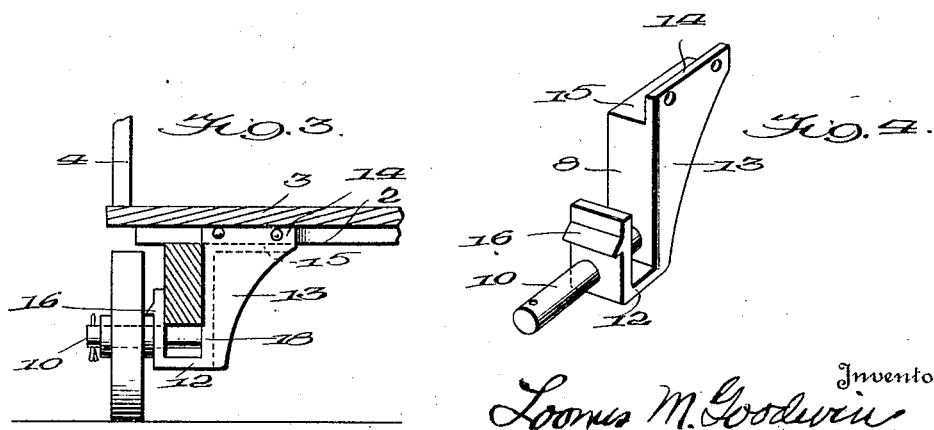
Inventor
Loomis M. Goodwin,
By R. Clyde Cruix
Attorney Patented Mar. 29, 1932

1,851,094

UNITED STATES PATENT OFFICE

LOOMIS M. GOODWIN, OF RALEIGH, NORTH CAROLINA

TOBACCO TRUCK

Application filed July 13, 1928. Serial No. 292,543.

This invention relates to certain improvements in tobacco trucks, comprising the combination of wheels and runners, similar to that disclosed, in the patent to Rhoades, 1,357,117, and more particularly to an improved means for mounting the wheels in the rear ends of the runners.

The truck as set forth in the Rhoades patent above referred to, is of great utility in the art and admirably adapted for general and extensive use in handling crops owing to its simplicity and the fact that the whole truck can be easily and cheaply manufactured. Also the inherent qualities of a truck of this type, add greatly to its adaptability to this kind of work, such as the low mounting of the body or platform and the automatic elevating from, and lowering to the ground of the forward end of the truck in going up and down hills respectively.

The salient defect of this truck, however, is that no proper or practicable means are provided for mounting the wheels in the rear ends of the runners, the axles for the same merely extending through said runner. This necessitates the making of the runner of hard, heavy and comparatively expensive wood and even then, the holes therethrough for receiving the axles, soon become enlarged and out of round due, especially, to the fact that there is no means for preventing the axles from turning in the runners. At the same time the runner is weakened to such an extent that owing to the heavy loads carried, a twisting or swerving of the truck will quite often result in the splitting of the runners and a displacement of the wheels, and necessitating a replacement of the old runner by a new one, which latter installation may also be subsequently rendered useless by reason of the same defect.

The present invention seeks to overcome the above enumerated defects and at the same time preserve the simplicity and low manufacturing costs of the truck and practically eliminating expense for repairs.

Generally stated, the truck in the present instance contemplates in the preferred form a U-shaped metallic bracket or support embracing the rear end of each runner, the brackets being in close contact with both sides of their respective runners, each bracket extending substantially from the top inner edge of the runner, under the lower edge and up the outside of the runner sufficiently to provide the necessary bearing for the axle, which in the preferred form is integral with the bracket. This bracket, which is preferably of cast metal, is provided with a reinforcing web, the upper edge of which forms a novel means for securing said bracket in operative position and also acts as a strengthening knee for the runner, said bracket in addition may also be secured by suitable fastening to said runner. If desired, these U-shaped brackets may be provided with projecting flanges to exclude dirt and sand from between the wheel and axles as shown in Figs. 3 and 4. Furthermore the bracket and axle may be separate units as shown in Fig. 5, the bracket being provided with the necessary holes for receiving a stub axle.

The preferred embodiment of the invention is illustrated in the accompanying drawings in which, Figure 1 is a side elevation of the assembled truck;

Fig. 2 is a view partly in transverse section and partly in elevation showing the manner of mounting the bracket and supporting wheel with respect to the truck structure;

Fig. 3 is a similar view with the addition of the sand flange for the purpose to be hereinafter described;

Fig. 4 is a perspective view of the improved bracket showing the preferred form wherein the stub axle is cast as an integral part of the bracket; and Fig. 5 is a similar perspective view wherein the bracket and stub axle are separate units, said bracket being bored or provided with the necessary apertures for receiving the stub axle.

Referring to the drawings in detail the improved truck comprises a pair of runners 1, cross members 2, a platform or bottom 3 and a series of standards 4.

Mounted near the rear ends of each of the runners 1 is a wheel 5 and the forward curved ends of said runners are provided, if desired, with metallic wear plates or shoes 6, the upper end of each shoe being conveniently formed into a clevis 7 comprising a means of attachment for hauling said truck.

The truck as described so far, is substantially the same as that set forth in the patent to Rhoades above referred to, the present invention being directed to the particular means and arrangement for mounting the wheels in the runner, whereby the said runners will be properly strengthened and a substantial mounting provided for the wheels and axles.

This arrangement comprises preferably a U-shaped metallic bracket or the like 8 for the rear end of each runner, said bracket embracing the lower edge and both sides of each runner and being properly secured thereto by screws or similar fastenings 9. This bracket is preferably made of cast metal having formed integrally therewith a stub axle or the like 10, the lower edge of the runner 1 being cut out as shown at 11 to accommodate the axle when the bracket is secured to said truck. The bracket is provided with a U-shaped portion 12 adapted to embrace the lower edge and sides of the runner 1 and said bracket is further provided with an inwardly extending reinforcing web 13, the upper edge 14 of said web providing a means of securing the bracket to an adjacent cross member 2 or the like of the truck body. The inner upper part of the bracket is also provided wtih a leg or flange 15 which is adapted to underlie the cross member to which the reinforcing web is secured forming an additional support and bracing means for the runner and associated parts.

In the construction as shown in Figs. 3 and 4 that portion of the bracket embracing the outside of the runner, is provided with a sand flange or the like 16 which overhangs the hub of the wheel to exclude dirt and sand from between the wheel bearing and axle.

Fig. 5 illustrates a modification wherein the bracket and stub axle are formed as separate units which may be desirable in some cases. In this event it is only necessary to form the lower end of the bracket with openings or apertures 17 through which the stub axle 18 is inserted in an obvious manner.

What I claim is:

1. In a truck, the combination with a pair of runners and connecting cross members or the like, of wheels for supporting said runners, a right angle bracket embracing each runner, an inwardly extending reinforcing web formed integral with both right angle legs of said bracket, means for securing the vertical right angle leg of the bracket to the runner and the reinforcing web to an adjacent cross member and a stub axle integrally cast with the bracket.

2. In a truck, the combination with a pair of longitudinal members and connecting cross members or the like, of wheels for supporting said structure, a right angle bracket secured to each longitudinal member, an inwardly extending reinforcing web formed integral with said bracket and connecting the vertical and horizontal legs thereof, means for securing the reinforcing web to an adjacent cross member and a stub axle carried by said bracket.

3. In a truck, the combination with a pair of longitudinal members and connecting cross members or the like, of wheels for supporting said structure, a right angle bracket secured to the inner face of each longitudinal member, an inwardly extending reinforcing web formed integral with said bracket and connecting the vertical and horizontal legs thereof, said web extending above the horizontal leg providing a means for securing the bracket to an adjacent cross member, the lower end of each bracket being provided with a U-shaped portion whereby the longitudinal members will be embraced by said U-shaped portion and a stub axle carried by each bracket.

In testimony whereof I affix my signature.

LOOMIS M. GOODWIN.